United States Patent
Iwamoto (10) Patent No.: US 10,539,840 B2
(45) Date of Patent: Jan. 21, 2020

(54) LIQUID CRYSTAL DISPLAY

(71) Applicant: STANLEY ELECTRIC CO., LTD., Meguro-ku, Tokyo (JP)

(72) Inventor: Yoshihisa Iwamoto, Yokohama (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/022,374

(22) Filed: Jun. 28, 2018

(65) Prior Publication Data

US 2019/0018291 A1    Jan. 17, 2019

(30) Foreign Application Priority Data

Jul. 12, 2017  (JP) .................................. 2017-136390

(51) Int. Cl.
| | | |
|---|---|---|
| *G02F 1/1343* | (2006.01) | |
| *G02F 1/1335* | (2006.01) | |
| *G02F 1/1362* | (2006.01) | |
| *G02F 1/1368* | (2006.01) | |
| *G09G 3/36* | (2006.01) | |
| *G02F 1/13363* | (2006.01) | |

(52) U.S. Cl.
CPC ...... *G02F 1/134309* (2013.01); *G02F 1/1368* (2013.01); *G02F 1/13363* (2013.01); *G02F 1/133514* (2013.01); *G02F 1/133528* (2013.01); *G02F 1/136213* (2013.01); *G09G 3/3622* (2013.01); *G09G 3/3648* (2013.01); *G02F 2001/133638* (2013.01); *G02F 2201/121* (2013.01); *G02F 2201/123* (2013.01)

(58) Field of Classification Search
CPC ......... G02F 1/134309; G02F 1/133514; G02F 1/136213; G02F 1/1368; G02F 1/133528; G02F 1/13363; G02F 2001/133638; G02F 2201/121; G02F 2201/123; G09G 3/3648; G09G 3/3622

USPC .......................................................... 349/194
See application file for complete search history.

(56) References Cited

U.S. PATENT DOCUMENTS

| | | | | |
|---|---|---|---|---|
| 6,317,178 B1* | 11/2001 | Brandt | ............... | G02F 1/133382 349/147 |
| 7,705,933 B2* | 4/2010 | Matsushima | ......... | G02F 1/1323 349/74 |
| 2004/0125430 A1* | 7/2004 | Kasajima | .......... | G02F 1/133536 359/247 |

FOREIGN PATENT DOCUMENTS

| | | |
|---|---|---|
| JP | 2001066626 A | 3/2001 |
| JP | 2003043449 A | 2/2003 |

\* cited by examiner

*Primary Examiner* — Charles S Chang
(74) *Attorney, Agent, or Firm* — Holtz, Holtz & Volek PC (57) ABSTRACT

A LCD device containing an active drive dot matrix LCD element, each pixel containing subsidiary pixels each having a color filter; a passive drive segment display LCD element laminated on rear side of the active drive LCD element, having segment electrode, arranged to be applied with a set voltage, the segment electrode having edge defining a segment shape; cross-nicol polarizers disposed on both outer sides of the LCD elements; controller circuit including first part controlling voltages to be applied to subsidiary pixels, and second part controlling voltages to be applied to the segment electrode; wherein the display device produce normally black display in the absence of applied voltage; and wherein when the segment electrode is activated, those subsidiary pixels in pixels outside the edge of the activated segment electrode are partly driven and partly not driven, displaying different color or intermediate grade, than the conventional art.

11 Claims, 8 Drawing Sheets

FIG. 2B $$T = \frac{1}{2} \sin^2(2\phi) \sin^2\left(\frac{\pi \Delta nd}{\lambda}\right)$$

LIQUID CRYSTAL DISPLAY

BACKGROUND OF THE INVENTION

Field

This invention relates to a liquid crystal display.

Related Art

Liquid crystal displays are used in various applications, and are desired to be capable of selecting positive display or negative display depending on the usage. Proposal of a liquid crystal display has been made in which two nematic liquid crystal layers are arranged in lamination between cross-nicol polarizers, and positive or negative display can be selected optionally by setting voltage application on one of the liquid crystal layers on or off (for example, Japanese Patent Laid-Open JPA 2001-066626).

Automobiles are progressively equipped with active matrix liquid crystal display (LCD) having an active element such as switching thin film transistor (TFT) for each pixel of dot matrix. Such active matrix LCDs are used for navigation system, information display system, etc. When an active element is turned on, a signal voltage is supplied to a related pixel and then the active element is turned off, to maintain the signal voltage stored in the pixel. Display can be made during almost the whole period. Dot matrix display can display various shapes by arbitrarily selecting dots.

In case of using a dot matrix in which dots are aligned in horizontal and vertical directions, lines in horizontal or vertical direction can be displayed almost adequately, but lines along a slanted direction or curves are displayed as combination of horizontal lines and vertical lines, which can easily generate zigzag impression in the edge.

Segment display using segment electrode displays a fixed pattern which can have smooth edge. Usually, number of display elements in segment display is limited. For example, two groups of crossing electrodes are disposed sandwiching a liquid crystal layer therebetween, and each one electrode for the two groups of electrodes are selected to drive one segment. The segment electrodes are driven in passive drive such as direct multiplex, simple matrix, etc. Passive drive will make the drive time for each segment in one period short.

Such liquid crystal display that has a laminated structure including a liquid crystal display of passive drive segment display laminated on front surface of a liquid crystal display of active drive dot matrix, provided with a light source on the rear side of the lamination is also proposed (for example, see JPA 2003-043449).

Figure 6:
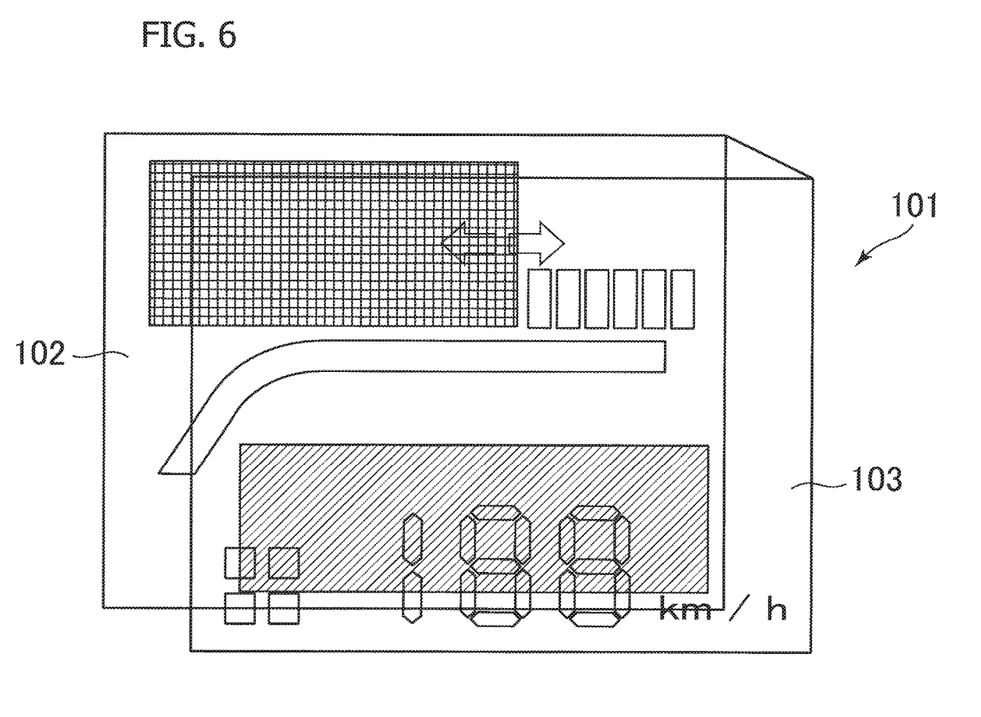
FIG. 6 is a schematic perspective view of laminated liquid crystal display according to related art, in which a passive drive segment liquid crystal display is disposed on the front side of active drive dot matrix electrode liquid crystal display.

As illustrated in FIG. 6, a passive drive segment liquid crystal display 103 is disposed on front side of an active drive dot matrix liquid crystal display 102, to constitute a laminated liquid crystal display 101. The dot matrix liquid crystal display 102 is formed of a transparent type TFT driven liquid crystal display, enabling backlight illumination. For preventing the segment liquid crystal display 103 shielding the dot matrix display, the segment liquid crystal display 103 is formed of a normally white mode transparent type liquid crystal display. It is disclosed that dot matrix is used, for example, to display instantaneously changing navigation picture, and segment display is used to display thereon driving speed, turn signal, alarm display, etc.

Recently, normally black mode liquid crystal display having excellent display grade has been employed. For example, there is known a liquid crystal display which can reduce the light transmissivity of black level realizing high contrast by combining vertically aligned liquid crystal layer and cross-nicol polarizers. In such liquid crystal displays, non-displayed area becomes light-shielding area. When a normally black mode display is superposed above a dot matrix display, display formed in the dot matrix disposed under non-displayed area will be hidden. Therefore, limitation is added on the display contents.

SUMMARY

A liquid crystal display which can adequately combine a dot matrix display and a segment display is provided.

According to an embodiment, there is provided a liquid crystal display including an active drive liquid crystal display having a plurality of pixels capable of performing dot matrix display, each of the pixels containing a set of subsidiary pixels each of which is equipped with a color filter on a liquid crystal layer, and each of the subsidiary pixels has an active element capable of controlling voltage applied to the liquid crystal layer; a passive drive liquid crystal display laminated on rear side of the active drive liquid crystal display, having a common electrode connected to a common voltage and a segment display electrode facing the common electrode while sandwiching a liquid crystal layer therebetween, to be connected to a set voltage to display a segment shape; a front side polarizer disposed on front side of the active drive liquid crystal display; a rear side polarizer disposed on rear side of the passive drive liquid crystal display and constituting cross-nicol polarizers with the front side polarizer; a back light disposed on rear side of the rear side polarizer; and a controlling circuit including a first control part for controlling voltages to be applied to respective subsidiary pixels of the active drive liquid crystal display, and a second control part for controlling voltages applied between respective segment electrodes and the common electrode of the passive drive liquid crystal display; wherein characteristics of the active drive liquid crystal display, the passive drive liquid crystal display, the front side polarizer, and the rear side polarizer are so set as to produce normally black display state in the absence of applied voltage; and wherein when segment display is performed the subsidiary pixels contained in pixels of the active drive liquid crystal display overlapping outer area of the segment display electrode to be driven are partly driven and partly not driven, capable of displaying different color or grade, compared to case when pixels overlapping outer region of the segment display electrode to be driven are not driven.

Reference symbols: LCD liquid crystal display, PE passive drive element, AE active drive element, DR1 passive drive circuit, DR2 active drive circuit, Px pixel, CF color filter, DME dot matrix electrode, SP subsidiary pixel, SPE subsidiary pixel electrode, TFT thin film transistor, C storage capacitor, SE segment display electrode, CE common electrode, P1, P2 polarizer, 10 segment display part, 11, 12, 21, 22 glass substrate, 13, 23 liquid crystal layer, 20 dot matrix display part, 24 common electrode, 25 TFT array, 101 laminated liquid crystal display, 102 dot matrix liquid crystal display, 103 segment liquid crystal display.

DESCRIPTION OF THE PREFERRED EMBODIMENTS

The present inventor and the colleagues have been studying and developing liquid crystal display which contains a passive drive liquid crystal display of segment display laminated on a rear side of an active drive liquid crystal display of dot matrix, and operates in normally black mode. There is no polarizer between the laminated liquid crystal displays, and a pair of polarizers are disposed on the two outer sides of the laminated liquid crystal displays, in cross-nicol arrangement. For example, in a vehicle-mounted liquid crystal display, an active drive liquid crystal display presents navigation picture, and passive drive liquid crystal display displays at least one of running speed, turn signal and alarm or warning.

Figure 1A:
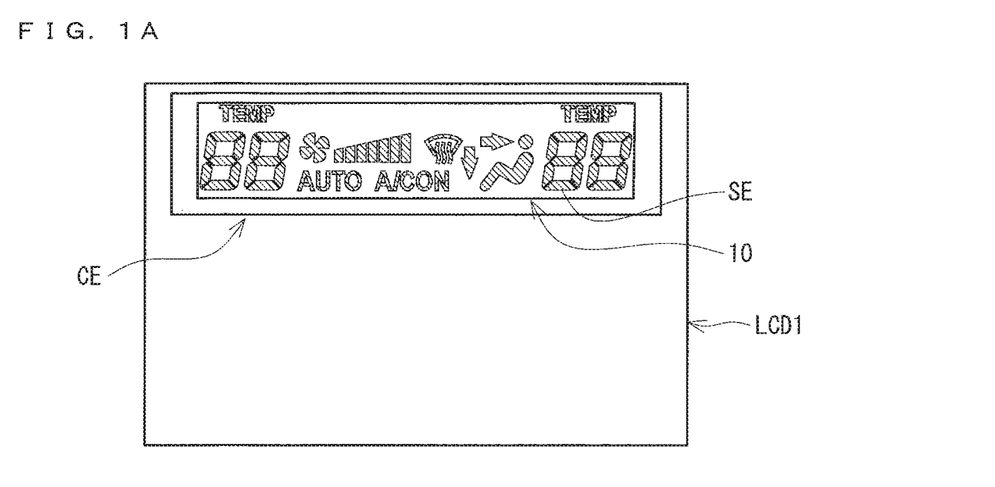
FIGS. 1A and 1B are plan views of a passive drive liquid crystal display LCD1 having segment display part disposed on lower side, and of an active drive liquid crystal display LCD2 having dot matrix display part disposed on upper side, in a laminated structure liquid crystal display according to a basic structure.

FIGS. 1A-1F illustrate plan views, an equivalent circuit diagram, and a cross section illustrating structure of a liquid crystal display according to a basic structure. FIG. 1A is a plan view of a passive drive liquid crystal display LCD1 having a segment display part 10. In the segment display part 10 within an effective display area, segment electrodes of fixed shapes are arranged. The segment display electrode has smoothly extending boundary or boundaries. Common electrode CE has an area containing the segment display part, and is connected for example to a common voltage. The voltage difference between the segment electrode and the common electrode performs display corresponding to the segment display electrode SE. In the figure, display for air conditioner is exemplified. The operation state of the air conditioner is illustrated at a central part, and temperatures at the driver's seat and the assistant's seat are illustrated at both left and right sides.

When the segment display electrode SE is turned ON, orientation of liquid crystal layer in the area of the segment display electrode SE changes to change the retardation of the liquid crystal layer so that the incident light passes through the pair of polarizers in cross-nicol arrangement to exhibit white display. Outside the area of the segment display electrode SE, orientation of the liquid crystal layer does not change, to cause no change in the retardation so that the incident light is shielded by the pair of polarizers in the cross-nicol arrangement to exhibit black display. Background of the display of the conventional segment display electrode SE is only black. There has been known no art of displaying colored background.

Figure 1B:
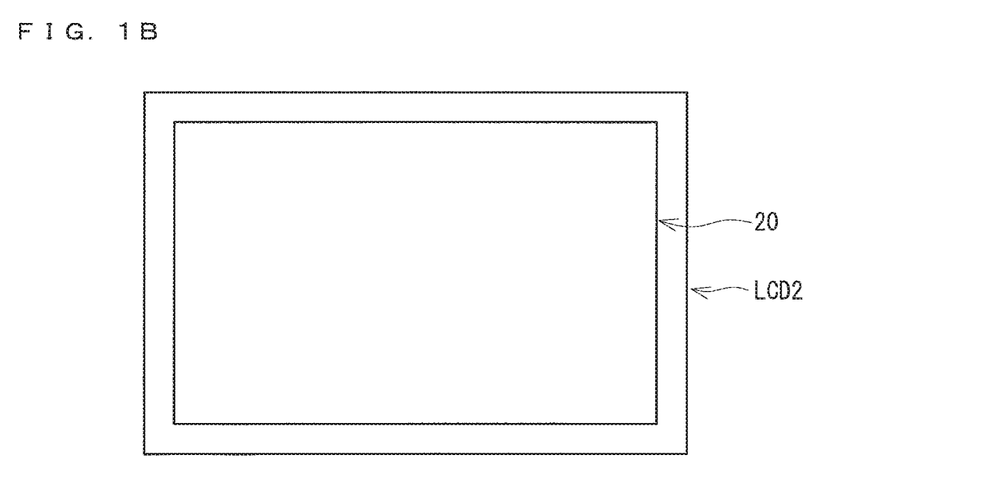

FIG. 1B is a plan view of an active drive liquid crystal display LCD2 having dot matrix display part 20. Over the whole effective display area, dot matrix display part 20 is formed. The segment display part 10 overlaps on part of the dot matrix display part.

Figure 1C:
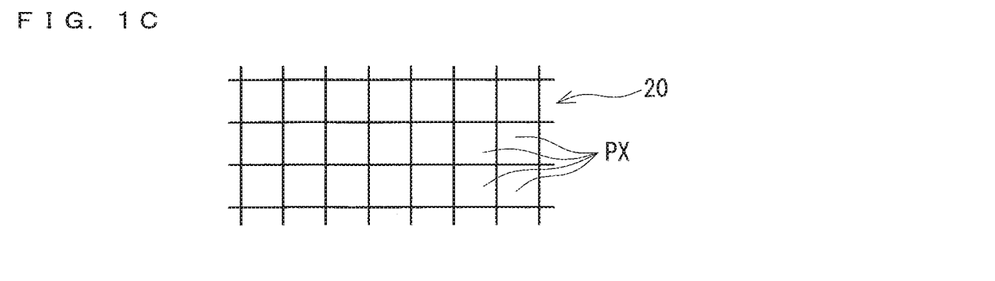
FIG. 1C is a plan view illustrating arrangement of pixels Px in the dot matrix display part in which square shaped pixels are regularly aligned along the vertical and horizontal directions.

FIG. 1C illustrates an example of a multiplicity of pixels Px regularly arranged in up/down vertical direction and left/right horizontal direction, in the dot matrix display part 20. Pixels Px of rectangular shape are arranged in vertical direction and in horizontal direction. Each pixel contains a plurality of subsidiary pixels equipped with respective color filters.

Figure 1D:
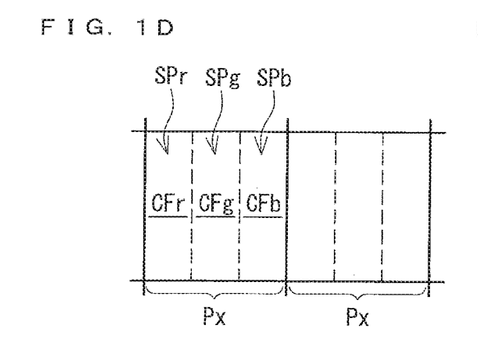
FIGS. 1D and 1E are plan views illustrating two disposal examples of one set of subsidiary pixels SPr, SPg, and SPb equipped with triple color (R, G, B) filters CFr, CFg, and CFb.
Figure 1E:
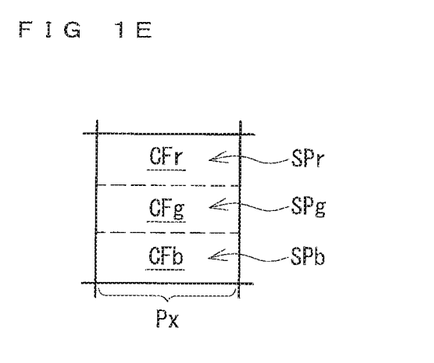

FIGS. 1D and 1E illustrate two arrangement examples of subsidiary pixels SPr, SPg, and SPb, including red filter region CFr, green filter region CFg, and blue filter region CFb, in each pixel Px. A subsidiary electrode is disposed in correspondence to each subsidiary pixel. A common electrode is formed to sandwich liquid crystal layer with the subsidiary electrodes. FIG. 1D illustrates a case in which one pixel Px contains three subsidiary pixels SPr, SPg, and SPb, each extending in vertical direction, and FIG. 1E illustrates a case in which one pixel Px contains three subsidiary pixels SPr, SPg, and SPb, each extending in horizontal direction. It is possible to adopt other patterns of subsidiary pixel combination.

Figure 1F:
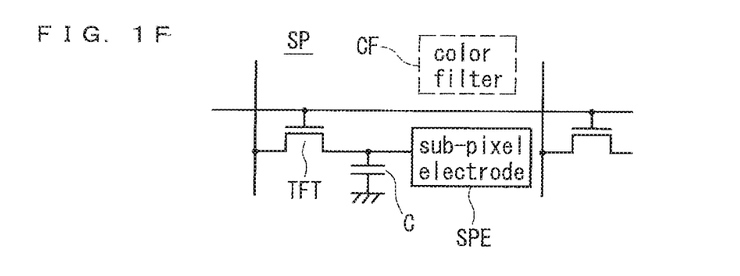
FIG. 1F is an equivalent circuit diagram illustrating structure of a subsidiary pixel.

As is illustrated in FIG. 1F, subsidiary pixel electrode SPE of each subsidiary pixel SP is equipped with a storage capacitor C, and is connected to a thin film transistor TFT for switching the image signal. Ground electrode of the storage capacitor C is formed of the common electrode. Switching signal is applied to the gate electrode of the thin film transistor TFT to turn on the thin film transistor TFT and receive the image signal through the source (drain), and store the image signal in the storage capacitor C. The thin film transistor is then turned off by turning off the gate electrode. Since the switching transistor is turned off, image signal is stored in the storage capacitor C and is maintained. The subsidiary pixel electrode SPE is covered with a color filter CF. Color of the respective pixels in the dot matrix display part 20 can be arbitrarily determined.

Figure 1G:
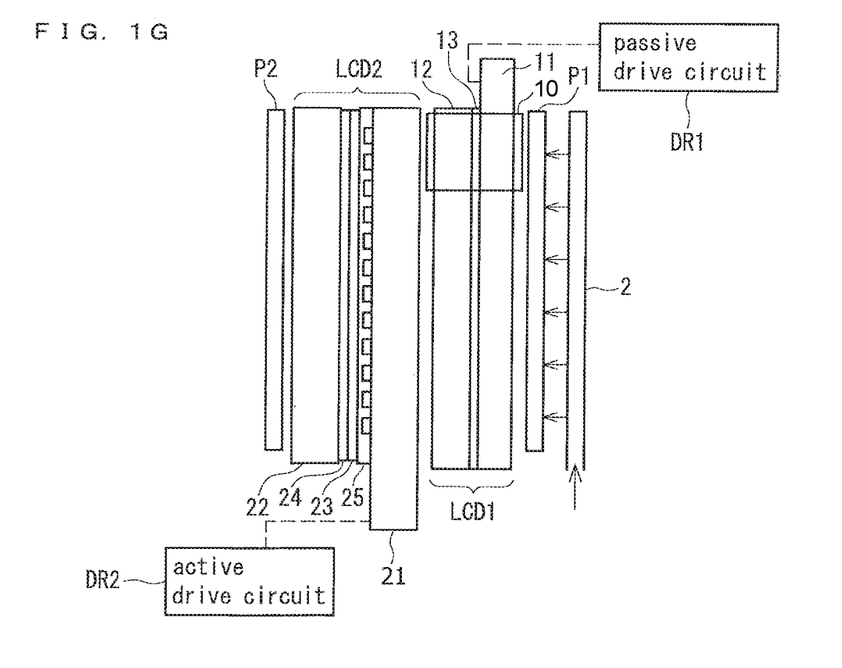
FIG. 1G is a cross section illustrating cross-sectional structure of a liquid crystal display including the laminated structure.

As is illustrated in FIG. 1G, for example, an active drive liquid crystal display LCD2 actively driven by using TFTs is disposed above a passive drive liquid crystal display LCD1 driven in simple matrix, to constitute a lamination structure. The passive drive liquid crystal display LCD1 contains a liquid crystal layer 13 between a pair of glass substrates 11 and 12. The passive drive liquid crystal display LCD1 includes the segment display part 10, which includes the segment display electrode SE as shown in FIG. 1A. The active drive liquid crystal display LCD2 has a TFT array 25 connected to respective subsidiary pixel electrodes on a lower glass substrate 21, and a common electrode 24 provided with color filters on an upper substrate 22. A liquid crystal layer 23 is disposed between the subsidiary pixel electrodes connected to the TFT array 25 and the common electrode 24.

For example, the passive drive liquid crystal display LCD1 has group of external connection terminals in upper area, which are connected to passive drive circuit DR1, and the active drive liquid crystal display LCD2 has group of external connection terminals in lower area, which are connected to active drive circuit DR2. The passive drive circuit DR1 controls display of the passive drive liquid crystal display. The active drive circuit DR2 controls firstly the display of the active drive liquid crystal display outside the area of the segment electrodes in the passive drive liquid crystal display, and secondly voltages applied to subsidiary pixels in the pixels overlapping the segment electrode area, as will be described later.

A first polarizer P1 is disposed on rear side of the passive drive liquid crystal display LCD1, and a second polarizer P2 is disposed on front side of the active drive liquid crystal display LCD2. A pair of polarizers P1 and P2 constitute cross-nicol. A backlight 2 is disposed on rear side of the first polarizer P1. In the laminated device, orientations of the liquid crystal layers and the arrangement of the polarizers are so designed to realize normally black mode which displays black state in the absence of applied voltage.

For example, such combinations as following can be considered as the combination of the passive drive liquid crystal display LCD1 and the active drive liquid crystal display LCD2:
(1) two liquid crystal cells of 90-degrees twisted nematic (TN) mode of mono-domain or two-domain orientation, having reverse twist direction, and having orientation directions of molecules at the center of the liquid crystal layers crossing orthogonally;
(2) two vertically aligned liquid crystal cells of mono-domain or two-domain orientation, having orientation directions of molecules at the center of the liquid crystal layers crossing each other; and
(3) two liquid crystal cells one of which is a in-plane switching liquid crystal cell in which liquid crystal molecules perform switching in the substrate plane, and the other of which is a vertically aligned liquid crystal cell of mono-domain or two-domain orientation, in which orientation directions of molecules at the center of the liquid crystal layers crossing each other when voltage is applied to the in-plane switching liquid crystal cell.

When the passive drive liquid crystal display LCD1 is driven, segment electrode is driven to perform display of segment electrode. When the active drive liquid crystal display is driven, driven subsidiary pixels in the dot matrix electrodes provided with color filters perform colored display. Non-selected subsidiary pixels do not allow passage of the incident light. Since there is provided no polarizer between the two liquid crystal displays, when the both liquid crystal displays are driven, operation becomes as if the retardations of the two liquid crystal displays are unified.

Figure 2A:
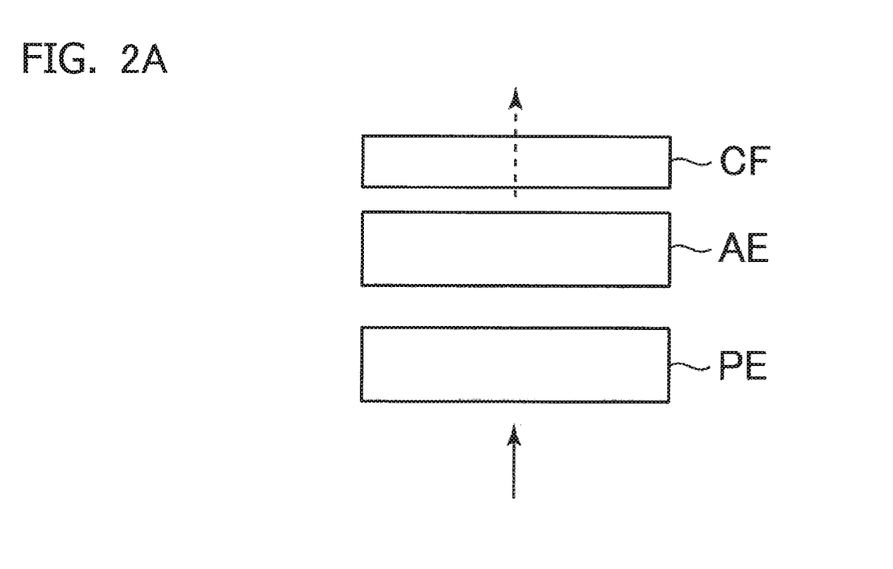
FIG. 2A is a simplified cross section illustrating lamination structure illustrated in FIG. 1G.

FIG. 2A is a schematic cross section illustrating the laminated structure of the liquid crystal display device. A passive drive liquid crystal display having segment display electrode LCD1 constitutes a passive element PE, an active drive liquid crystal display LCD2 having dot matrix electrodes constitutes an active element AE there above, and color filter CF is disposed further above. The passive element PE and the active element AE are both liquid crystal elements and arranged adjacent to each other. Thus, it is possible to study the function of the liquid crystal layers.

Figure 2B:
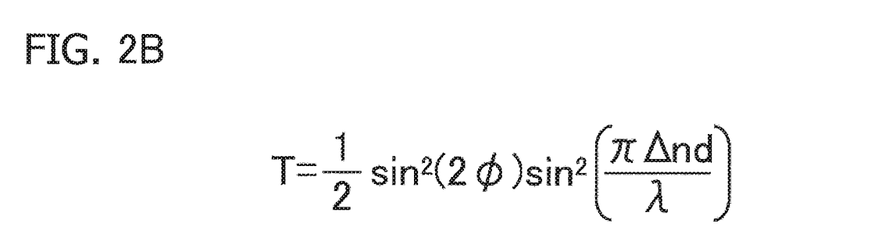
FIG. 2B is a mathematical representation of light transmission T of a liquid crystal display as a function of angle φ formed between polarization axis of one polarizer and alignment direction of liquid crystal molecules, and retardation Δ nd of the liquid crystal layer.

FIG. 2B is a numerical equation representing light transmissivity T of a liquid crystal element when light is incident on the liquid crystal element via a polarizer as a function of angle φ formed between polarization axis of one of pair of polarizers in cross-nicol arrangement and alignment direction of liquid crystal molecules of the liquid crystal layer disposed between the pair of polarizers, and retardation Δ nd of the liquid crystal layer. Symbol λ represents wavelength of the light. In the structure of FIG. 2A, retardations of liquid crystal layer of the passive element PE and liquid crystal layer of the active element AE may be analyzed collectively or unified.

When a voltage is applied to the passive element PE and the term due to the retardation becomes π/2, the transmissivity T takes an extremely high value. When a voltage is applied to the active element AE and the term due to the retardation becomes π/2, the transmissivity T similarly takes an extremely high value. However, when both the passive element PE and the active element AE are applied with respective voltages to cause retardations of respective π/2, the unified retardation becomes π or zero, the light transmissivity T becomes zero.

Normally when the segment electrode is driven, ON voltage is applied only to the passive element and the active element AE is set to OFF voltage. In the segment electrode area, retardation in the passive element PE changes by π/2 and retardation in the active element AE does not change. Retardation in the liquid crystal layers in the segment electrode area is changed to establish condition for passing incident light through the cross-nicol polarizers. The active element transmits the incident light, and exit light is generated through the color filter CF. In case RGB subsidiary pixels of the active element exist in the segment electrode area of the passive element PE, and all the subsidiary pixels are in OFF state to be optically transparent, RGB transmitted lights are generated to form white exit light. Normally outside the segment electrode area, both the passive element PE and the active element AE do not change retardation. Incident light is shielded by the cross-nicol polarizers, to display light shielding black.

Figure 3A:
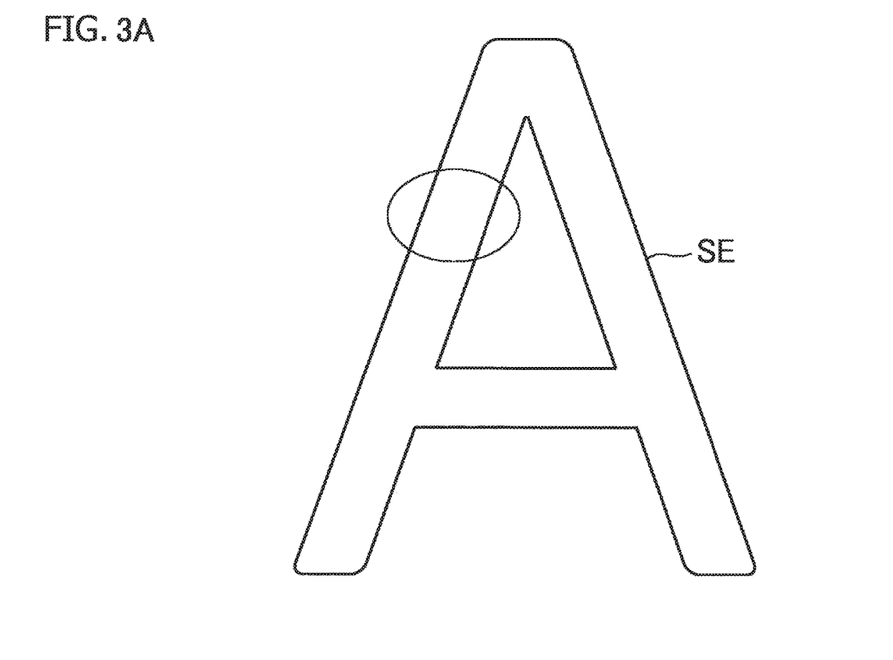
FIG. 3A is a plan view of electrode A as an example of segment display electrode SE.
Figure 3B:
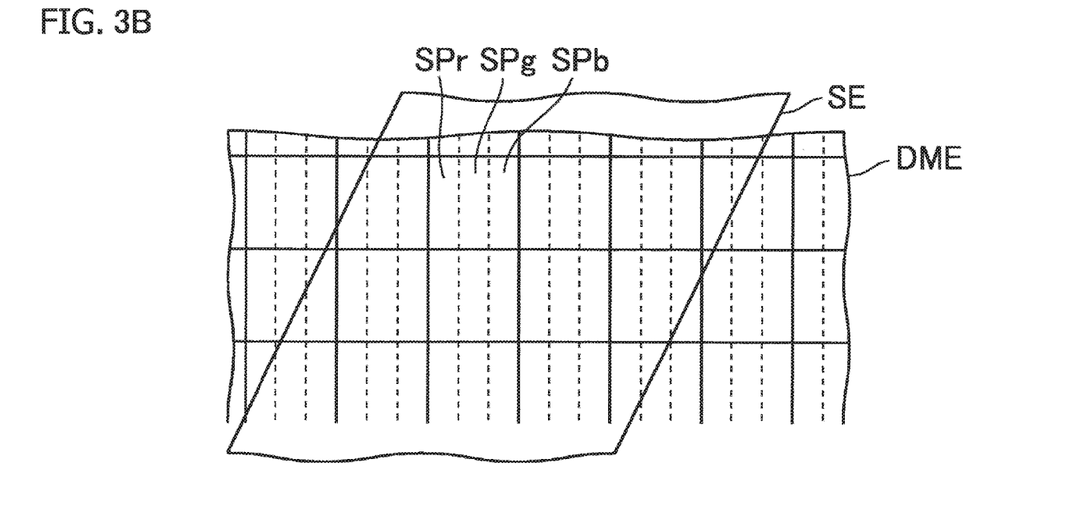
FIG. 3B is a plan view of a structural example of a dot matrix electrode DME disposed to overlap the segment display electrode SE.

FIG. 3A illustrates electrode of shape A, as an example of segment electrode SE. FIG. 3B illustrates also partial area of the dot matrix electrode DME disposed to overlap this segment electrode SE. In the segment electrode area, retardation is changed by voltage application. The dot matrix electrode DME includes subsidiary pixels SPr, SPg, and SPb corresponding to red filter region CFr, green filter region CFg, and blue filter region CFb. When all the subsidiary pixels are not applied with driving voltages, all the subsidiary pixels become transparent, and the exit light becomes white.

Normally, the area outside the segment electrode areas becomes black display as described above. Color filters exist above the dot matrix electrodes DME. Now analysis will be made on affording color to areas outside the segment electrode SE, utilizing the dot matrix electrodes DME and the color filters CF outside the segment electrode SE. Each pixel in the dot matrix electrode contains subsidiary pixels such as R, G, and B. When OFF voltage is applied to all the subsidiary pixels of a pixel, transmitted light through the pixel will become zero. When ON voltage is applied to part of the subsidiary pixels to leave other subsidiary pixels or pixel with OFF voltage, the subsidiary pixel of ON voltage will transmit light, and accompanying color filter affords color.

Figure 4A:
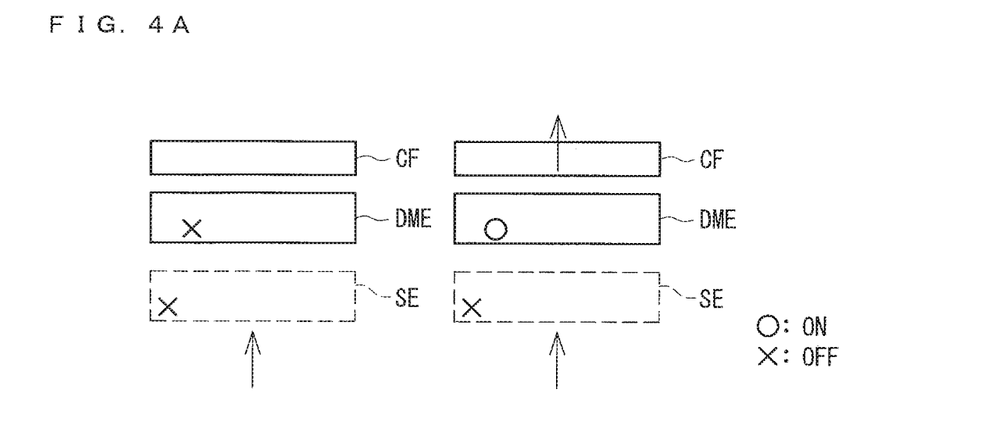
FIG. 4A is a schematic representation of emitted light changing with ON/OFF state of the dot matrix element DME disposed to overlap a segment display electrode SE of OFF state, on the assumption that region of the passive element region outside the segment display electrode SE is in OFF state.

FIG. 4A illustrates two active states of the laminated structure outside the segment electrode SE of the passive element PE. Since the position is outside the segment electrode SE of the passive element, ON voltage is not applied to the liquid crystal layer and the site is in the state of OFF voltage. On the left side, the dot matrix electrode DME of the active element is also set in OFF voltage state. Retardation of the liquid crystal layers do not change to bring the laminated structure is in the light shielding (black) state by the cross-nicol polarizers. On the right side, ON voltage is applied to the dot matrix electrode DME of the active element. Voltage is applied to only one of the liquid crystal layers, and hence the unified liquid crystal layer transmits the incident light. Exit light afforded with color is emitted from the color filter CF.

Figure 4B:
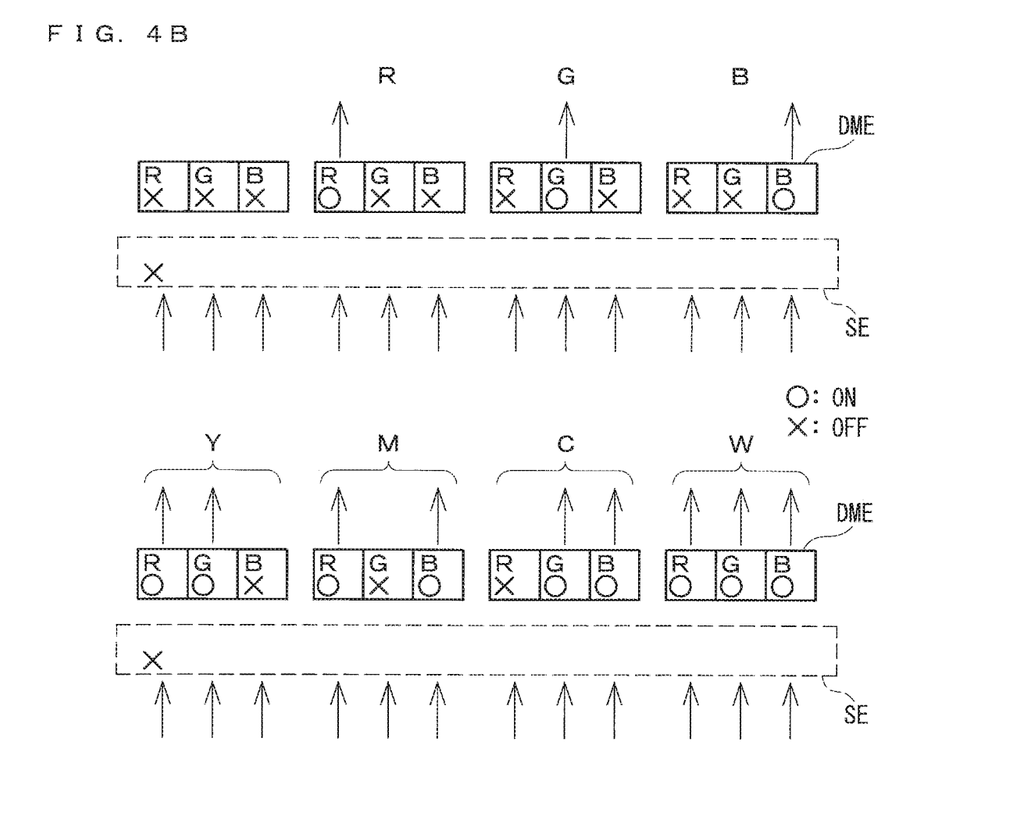
FIG. 4B is a schematic representation of emitted light changing with the ON/OFF state of RGB subsidiary pixels in a pixel of dot matrix electrode DME.

FIG. 4B is a schematic representation of various states of laminated structure. Position in passive element is outside the segment electrode SE and is in OFF voltage state. One set of subsidiary pixels in one pixel of dot matrix electrode DME of the active element is illustrated at each of eight locations. Various patterns of ON voltage are applied to sets of subsidiary pixels, and determine the afforded color.

When all the R, G, and B subsidiary pixels are applied with OFF voltages, no exit light is generated (that is, black display). When the R subsidiary pixel is applied with ON voltage and the G and B subsidiary pixels are applied with OFF voltages, exit light is emitted only from the R subsidiary pixel to display red (R). When the G subsidiary pixel is applied with ON voltage and the R and B subsidiary pixels are applied with OFF voltages, exit light is emitted only from the G subsidiary pixel to display green (G). When the B subsidiary pixel is applied with ON voltage and the R and G subsidiary pixels are applied with OFF voltages, exit light is emitted only from the B subsidiary pixel to display blue (B).

Two subsidiary pixels in one pixel may be driven transparent by applying ON voltages. When R and G subsidiary pixels are applied with ON voltages and the B subsidiary pixel is applied with OFF voltage, exit lights are emitted from the R and G subsidiary pixels. R and G are synthesized to display yellow (Y). When R and B subsidiary pixels are applied with ON voltages and the G subsidiary pixel is applied with OFF voltage, exit lights are emitted from the R and B subsidiary pixels. R and G are synthesized to display magenta (M). When G and B subsidiary pixels are applied with ON voltages and the R subsidiary pixel is applied with OFF voltage, exit lights are emitted from the G and B subsidiary pixels. G and B are synthesized to display cyan (C). When all the R, G, and B subsidiary pixels are applied with ON voltages, lights are emitted from all the R, G, and B subsidiary pixels. R, G, and B lights are synthesized to display white (W).

The segment electrode region has smooth boundary, while the dot matrix pixel and subsidiary pixels have square shapes, boundaries of the superposed two liquid crystal cells generally do not coincide. The pixel region of the dot matrix may extend across the boundary of the segment electrode. For preventing degrading the quality of segment display, dot matrix pixels overlapping the segment electrode is not applied with ON voltage when the segment electrode is applied with ON voltage.

Figure 4C:
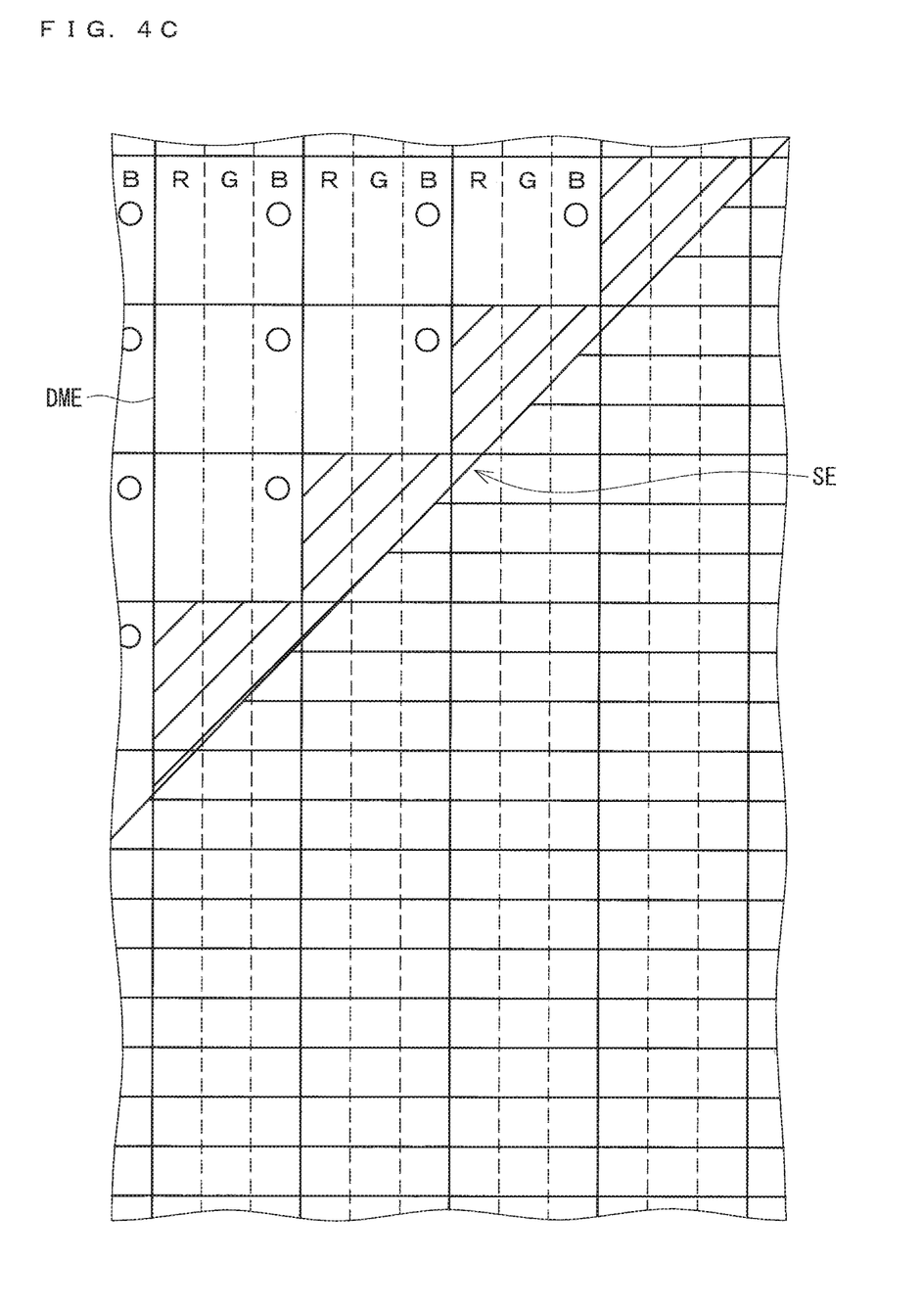
FIG. 4C is a schematic plan view illustrating emitted light when pixels of dot matrix electrodes DME in the area containing boundary of segment display electrode SE is OFF.

FIG. 4C is a schematic plan view lustrating a case where ON voltage is applied to segment electrode SE of the passive element, and ON voltage is applied to B subsidiary pixels of the dot matrix electrode DME of the active element in area outside the segment electrode SE. Slanted upper boundary of the segment electrode SE is indicated. The region of the segment electrode SE is applied with ON voltage to produce retardation change of π/2. Dot matrix electrodes of active element overlapping the segment electrode SE are kept in OFF state to cause no change of retardation. There retardation change of unified liquid crystal layer becomes π/2. The region of the segment electrode SE added with lateral hatching is transparent, and display white. In those dot matrix electrodes DME of the active element in the region outside the segment electrode SE, ON voltages are applied only to B subsidiary pixels, and R and G subsidiary pixels are kept in OFF state. R and G subsidiary pixels become light shielding, and B subsidiary pixels becomes transparent. Totally, blue background display is made.

Dot matrix electrodes DME extending across the boundary (edge) of the segment electrode SE are not applied with ON voltage. Within the segment electrode, retardation change of π/2 is caused by the voltage application to the segment electrode SE, and white display is done. Outside the segment electrode, no retardation change is caused, and light shielding state generates darkened area generation. Namely, irregular dark regions appear between the segment electrode SE area of white display and the blue display area of background area. In the figure, this dark region is indicated by left down slant hatching. When the resolution of subsidiary pixels is made high, the dark regions apparently become not conspicuous.

Figure 5:
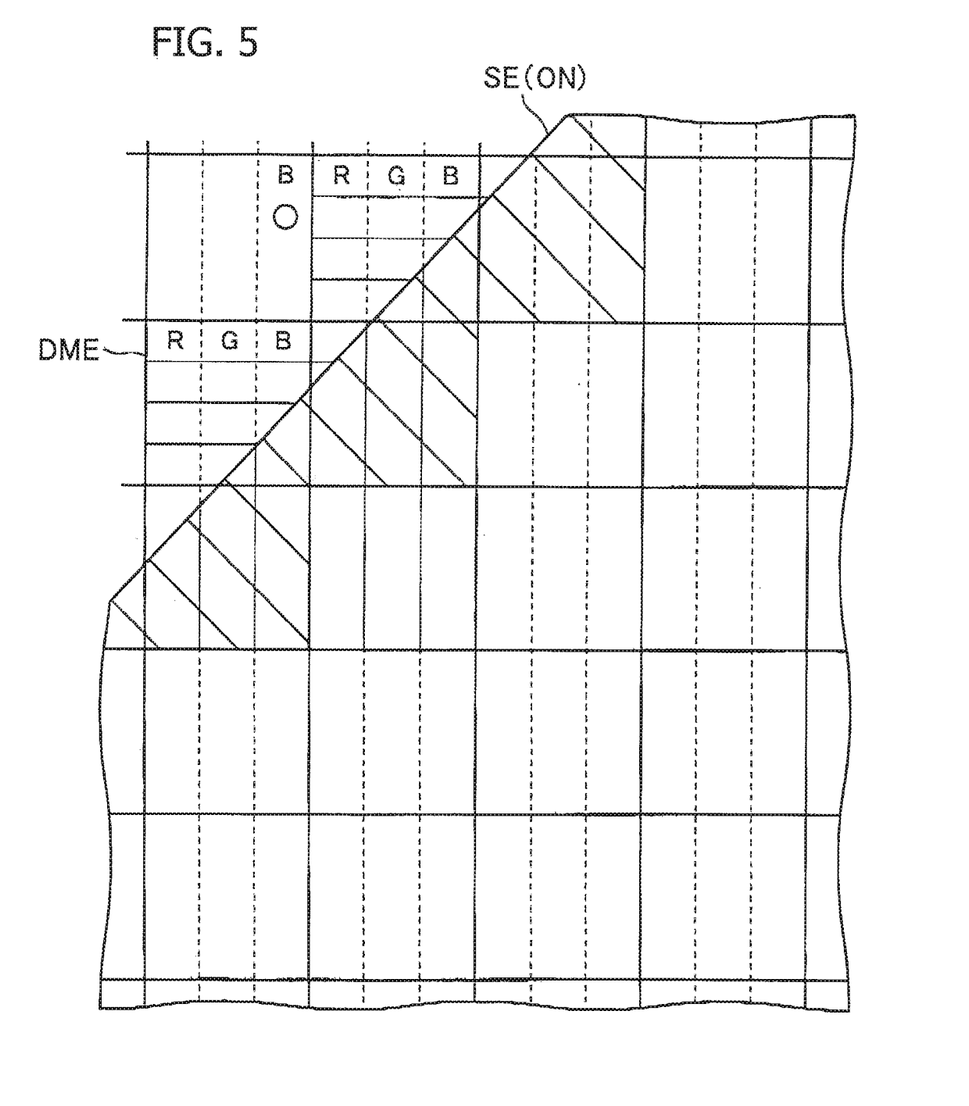
FIG. 5 is a schematic plan view illustrating emitted light distribution when pixels of dot matrix electrodes DME containing boundary of the segment display electrode SE are set to an intermediate grade display.

FIG. 5 illustrates an operation mode in which pixels of dot matrix electrodes DME extending across the boundary of segment electrode SE are switched to an intermediate level to cause intermediate grade display. For example, intermediate grade voltages are applied to R, G, and B subsidiary pixels of the dot matrix electrode. In FIG. 5, in the segment electrode SE region, regions indicated by right-down hatching are displayed at intermediate grade (gray) where the high brightness of white display in the central segment area is lowered to intermediate grade (gray display). Outside the segment electrode SE region, areas indicated with horizontal hatching are displayed at intermediate grade (gray) substituting the dark region as shown in FIG. 4C. Here, transmissivity can be raised. Even when the resolution is not high, it becomes possible to make adequate good display.

It is also possible to afford color to the above-mentioned intermediate grade display. Although description is made on the case where areas within the segment electrode are displayed in white (black-and-white) tone, subsidiary pixels in the dot matrix region can be independently controlled and hence it is possible to display in a single color or in mixed color and in various brightness, etc. It is also possible to add shading in the neighborhood of edge of the segment electrode region, form colored pattern within the segment electrode region, and afford gradation along certain direction.

Although description has been made on preferred embodiments, these descriptions are not restrictive. For example, exemplified shape and color are only examples and are not restrictive. It will be apparent to those skilled in the art that various changes, modification, substitutions, improvements etc. are possible within the scope of appended claims.

What are claimed are:

1. A liquid crystal display device comprising:
   an active drive liquid crystal display element having a plurality of pixels capable of performing dot matrix display, each of the pixels containing a set of subsidiary pixels each of which comprises a liquid crystal layer, electrodes sandwiching the liquid crystal layer, and a color filter above the liquid crystal layer, and each of the subsidiary pixels including an active element capable of controlling voltage applied to the electrodes sandwiching the liquid crystal layer;

a passive drive liquid crystal display element laminated on a rear side of the active drive liquid crystal display element, the passive drive liquid crystal display element having a common electrode connected to a common voltage, at least one segment electrode facing the common electrode, and a liquid crystal layer sandwiched therebetween, the segment electrode being arranged to be applied with a set voltage, and the segment electrode having a smoothly extending edge defining a segment shape;

a front side polarizer disposed on a front side of the active drive liquid crystal display element;

a rear side polarizer disposed on a rear side of the passive drive liquid crystal display element and constituting cross-nicol polarizers with the front side polarizer;

a back light disposed on a rear side of the rear side polarizer; and a controlling circuit including a first control part for controlling voltages to be applied to respective subsidiary pixels of the active drive liquid crystal display element, and a second control part for controlling voltages applied between the segment electrode and the common electrode of the passive drive liquid crystal display element;

wherein at least one of the pixels of the active drive liquid crystal display element extends across a boundary of the segment electrode of the passive drive liquid crystal display element;

wherein there is no polarizer between the liquid crystal layer of the active drive liquid crystal display element and the liquid crystal layer of the passive drive liquid crystal display element;

wherein characteristics of the active drive liquid crystal display element, the passive drive liquid crystal display element, the front side polarizer, and the rear side polarizer are so set as to produce normally black display state in the absence of applied voltages; and wherein when the segment electrode is activated, the subsidiary pixels contained in the pixels of the active drive liquid crystal display element outside the edge of the activated segment electrode are partly driven and partly not driven, capable of displaying different colors or intermediate grades, compared to a case in which pixels overlapping an outer region of the driven segment electrode are not driven.

2. The liquid crystal display device according to claim 1, wherein the active drive liquid crystal display element displays a navigation picture.

3. The liquid crystal display device according to claim 1, wherein the passive drive liquid crystal display element displays at least one of a running speed, a turn signal, and an alarm.

4. The liquid crystal display device according to claim 1, wherein when the segment electrode is activated, pixels which can be driven in the active drive liquid crystal display element are pixels outside the segment electrode and the at least one pixel extending across the boundary of the segment electrode.

5. The liquid crystal display device according to claim 4, wherein when the segment electrode is activated, the at least one pixel extending across the boundary of the segment electrode is controlled to intermediate grade display.

6. The liquid crystal display device according to claim 1, wherein the liquid crystal layer of the active drive liquid crystal display element and the liquid crystal layer of the passive drive liquid crystal display element are twisted nematic liquid crystal layers having opposite twist directions.

7. The liquid crystal display device according to claim 6, wherein a molecular orientation direction at a central position in a thickness direction of the active drive liquid crystal display element, and a molecular orientation direction at a central position in a thickness direction of the passive drive liquid crystal display element cross orthogonally.

8. The liquid crystal display device according to claim 1, wherein one of the active drive liquid crystal display element and the passive drive liquid crystal display element is a liquid crystal element of in-plane switching type, and the other is a vertical alignment type liquid crystal element.

9. The liquid crystal display device according to claim 8, wherein an orientation direction of the in-plane switching type liquid crystal element and an orientation direction of the vertical alignment type liquid crystal element cross each other.

10. The liquid crystal display device according to claim 1, wherein the active drive liquid crystal display element and the passive drive liquid crystal display element are both vertical alignment type liquid crystal elements and have orientation directions crossing each other.

11. The liquid crystal display device according to claim 1, wherein when the segment electrode is activated, pixels which can be driven in the active drive liquid crystal display element are pixels outside the segment electrode, and the at least one pixel extending across the boundary of the segment electrode is not driven.

* * * * *